United States Patent
Hey

(10) Patent No.: US 10,027,111 B1
(45) Date of Patent: Jul. 17, 2018

(54) AUXILIARY CIRCUIT FOR OVERVOLTAGE PROTECTION

(71) Applicant: ShoreTel, Inc., Sunnyvale, CA (US)

(72) Inventor: George Michael Hey, San Jose, CA (US)

(73) Assignee: Mitel Networks, Inc., DE (US)

( * ) Notice: Subject to any disclaimer, the term of this patent is extended or adjusted under 35 U.S.C. 154(b) by 367 days.

(21) Appl. No.: 14/834,018

(22) Filed: Aug. 24, 2015

(51) Int. Cl.
*H02H 3/20* (2006.01)
*H02H 9/04* (2006.01)
*H02H 1/06* (2006.01)

(52) U.S. Cl.
CPC ............... *H02H 9/04* (2013.01); *H02H 1/06* (2013.01)

(58) Field of Classification Search
CPC ............. H02H 9/04; H02H 9/041; H02H 3/02
USPC .......................................................... 361/86
See application file for complete search history.

(56) References Cited

U.S. PATENT DOCUMENTS

| | | | | |
|---|---|---|---|---|
| 5,570,257 A | * | 10/1996 | Manning | H02H 11/004 361/76 |
| 2008/0304193 A1 | * | 12/2008 | Shih | G05F 1/573 361/86 |
| 2010/0284114 A1 | * | 11/2010 | Kilroy | H02H 3/202 361/86 |

* cited by examiner

*Primary Examiner* — Dharti Patel

(57) ABSTRACT

An auxiliary circuit for providing current to an external device includes a first switch disposed between a first node and a second node. The first switch is configured to electrically couple the first node to the second node when a first voltage exceeds a first threshold. A comparison circuit has an input coupled to the second node and is configured to compare a second voltage at the input to a second threshold. A second switch has a control terminal coupled to an output of the comparison circuit, a first terminal coupled to a source, and a second terminal for coupling to the external device. The comparison circuit is configured to provide a third voltage at control terminal when the second voltage exceeds the second threshold. The second switch is configured to provide the current from the source to the external device when the third voltage exceeds a threshold of the second switch.

20 Claims, 4 Drawing Sheets ion
US 10,027,111 B1

AUXILIARY CIRCUIT FOR OVERVOLTAGE PROTECTION

FIELD OF INVENTION

Embodiments described herein relate generally to auxiliary circuits for overvoltage protection. The auxiliary circuits may be used, for example, in conjunction with conventional overvoltage protection devices to provide overvoltage protection to circuits such as telephony subscriber line interface circuits (SLICs).

BACKGROUND

In telephony systems, a foreign exchange station (FXS) may use SLICs to provide service to analog telephones. The SLICs are used to perform a number of different tasks such as supplying power to a telephone circuit, detecting telephone status (e.g., on-hook/off-hook), detecting dialing information, sending and receiving voice signals, supporting analog-to-digital and digital-to-analog conversion of voice signals, and other tasks.

Each telephone is connected to a SLIC by two wires that are referred to as Tip and Ring for legacy reasons. The telephony industry uses a negative voltage framework (i.e., a negative operating voltage on Tip and Ring with respect to earth ground) to prevent corrosion of the metal wires.

Many SLIC implementations employ a tracking voltage power supply that dynamically adapts its output voltage according to its present operating state and telephony loop characteristics. This allows it to generate only required voltages, thereby minimizing thermal dissipation and maximizing power efficiency.

Tip and Ring telephony wiring is subject to foreign electromagnetic disturbances that may be caused by a number of events such as lightning, proximity to other electronic wiring and/or devices (e.g., welding equipment), electrostatic discharge, and the like. The SLICs must be protected from the electromagnetic disturbances that exceed voltage ratings.

Overvoltage protectors may be used to protect SLICs from overvoltage disturbances imparted to the Tip and Ring wiring. There are two main types of overvoltage protectors commonly used with SLICs. One is a fixed overvoltage protector that limits voltages on the Tip and Ring between ground and a fixed negative potential. The other is a programmable overvoltage protector that limits the Tip and Ring voltages between ground and an externally-supplied, adjustable, negative voltage reference.

Programmable overvoltage protectors are often used with tracking power supply SLICs. Their programmable threshold is set according to the power supply output voltage. This provides improved margin against a maximum voltage rating for certain SLIC states. For example, on-hook and off-hook states demand lower supply voltages compared with a ringing state, whereas the ringing state usually requires negative voltages approaching the maximum rating of the SLIC. Thus, programmable overvoltage protectors having flexible ranges are often preferred over fixed overvoltage protectors.

Overvoltage protectors typically employ Thyristors, also known as silicon controlled rectifiers (SCRs), as controllable switches. In SLIC circuits, a Thyristor anode connects to circuit ground and a Thyristor cathode connects to the Tip (or Ring). For the programmable overvoltage protector, the Thyristor gate typically connects to the SLIC power supply voltage. The SLIC power supply voltage is normally more negative than that of the Tip or Ring, and thus the Thyristor gate-to-cathode junction is reverse biased, keeping the Thyristor in a non-conductive state. Should the Tip (or Ring) voltage become more negative than that of the SLIC power supply, the Thyristor gate-to-cathode junction becomes forward biased and gate conduction occurs. Sufficient gate current triggers the Thyristor to turn on, creating a low impedance path cathode to anode, effectively shunting the Tip (or Ring) to ground and protecting the SLIC. The programmable overvoltage protector device may be packaged as a pair of Thyristors, having a common control voltage pin for the SLIC power supply voltage connection, a common ground pin for connection to the anodes, and independent cathode pins for connection to the Tip and Ring conductors.

FIG. 1 depicts a commonly used topology of a SLIC circuit 110, an external tracking power supply circuit 120, and a programmable Thyristor-based overvoltage protection device 150. The SLIC control output 115 sets its negative output voltage level, conducting through steering diode 190, low pass filtered via capacitor 180, continuing to the SLIC 110 power input via diode 170. Voltage rail 160 connects to a gate of the overvoltage protection device 150. Should a negative voltage be imparted to Tip 130 or Ring 140 that is more negative than that of the voltage rail 160, Thyristor gate conduction occurs. Conduction current of sufficient magnitude into the gate will trigger the Thyristor. Thyristor gate conduction current is sourced by capacitor 180, and tends to charge the capacitor 180 more negatively with respect to ground. Capacitor current is determined according to the equation C*dv/dt. The dv/dt in this case is the rate of change of the transient voltage imparted to the Tip 130 or Ring 140 that is more negative than the voltage rail 160. With fast, negative-going transients, the gate current is sufficiently large to trigger the Thyristor-based overvoltage protection device 150 very quickly, protecting the SLIC. However, if dv/dt is relatively small, as might occur from a negative-going 50-60 Hz AC power line crossing the Tip 130 and/or Ring 140, the gate current may be insufficient to trigger the Thyristor. In this case the capacitor 180 will continuously charge negatively, causing the rail 160 to exceed a rating of the SLIC 110, resulting in electrical overstress damage.

Therefore, with slow changing, negative-going transient events, the output of the tracking power supply 120 may follow the imparted voltage, and the overvoltage protector 150 may fail to trigger the protection. Improvements are desired to provide an alternate source of Thyristor gate current should the voltage rail 160 exceed a negative threshold level.

SUMMARY

Embodiments described herein relate generally to auxiliary circuits that may be used with conventional overvoltage protection devices to ensure that integrated circuits, such as SLICs, are protected against overvoltage events. The auxiliary circuits may be particularly beneficial in protecting against slow changing overvoltage events. The auxiliary circuits provide current to the overvoltage protection devices during overvoltage events to ensure that the overvoltage protection devices turn on and clamp the voltage.

In accordance with an embodiment, for example, an auxiliary circuit configured to provide current to an overvoltage protection device during a negative-going overvoltage event includes a diode disposed between the first node and a second node. The diode is configured to electrically couple the first node to the second node when a first voltage at the first node exceeds a first threshold. A voltage divider has an input coupled to the second node, a reference coupled to ground, and an output. The voltage divider is configured to reduce a voltage between the input and the output. An operational amplifier has a first input coupled to the output of the voltage divider, a second input coupled to a voltage reference, and an output. The voltage reference provides a second threshold. A transistor has a control terminal coupled to the output of the operational amplifier, a first terminal coupled to the ground, and a second terminal. The operational amplifier is configured to provide a third voltage at the control terminal when a second voltage at the first input exceeds the second threshold. The transistor is configured to provide the current from the ground to the overvoltage protection device when the third voltage exceeds a threshold of the transistor. A voltage dropper has a first terminal coupled to the second terminal of the transistor and a second terminal coupled with the second node. The voltage dropper is configured to receive the current passing from the ground to the overvoltage protection device and to dissipate power from the current.

In an embodiment, the transistor is a metal-oxide-semiconductor field-effect transistor (MOSFET).

In another embodiment, the voltage divider is a resistive divider having a first resistance disposed between the input of the voltage divider and the output of the voltage divider and a second resistance disposed between the output of the voltage divider and the reference.

In another embodiment, the auxiliary circuit also includes a resistor disposed between the first terminal of the transistor and the second terminal of the transistor.

In another embodiment, the voltage dropper comprises a plurality of Zener diodes, and a voltage drop between the first terminal of the voltage dropper and the second terminal of the voltage dropper corresponds to a sum of Zener voltages of the plurality of Zener diodes.

In another embodiment, the auxiliary circuit also includes a power supply coupled with the operational amplifier. The power supply is configured to provide a supply voltage for the operational amplifier and for biasing the voltage reference. A backup switch has a third terminal and a fourth terminal. The third terminal is coupled to the first terminal of the transistor, and the fourth terminal is coupled to the second terminal of the transistor. The backup switch is configured to provide the current from the ground to the overvoltage protection device when the power supply fails or is disabled.

In another embodiment, the auxiliary circuit also includes a plurality of diodes each coupled with the second node and each coupled with an overvoltage protection device by a respective node.

In yet another embodiment, the voltage reference is provided by a Zener diode.

In accordance with another embodiment, an auxiliary circuit for providing current to an external device includes a first switch disposed between a first node and a second node. The first node is for coupling to the external device. The first switch is configured to electrically couple the first node to the second node when a first voltage at the first node exceeds a first threshold. A comparison circuit has an input coupled to the second node. A second voltage at the input of the comparison circuit is representative of the first voltage. The comparison circuit is configured to compare the second voltage to a second threshold. A second switch has a control terminal coupled to an output of the comparison circuit, a first terminal coupled to a source, and a second terminal for coupling to the external device. The comparison circuit is configured to provide a third voltage at the control terminal when the second voltage at the input exceeds the second threshold. The second switch is configured to provide the current from the source to the external device when the third voltage exceeds a threshold of the second switch.

In an embodiment, the second terminal of the second switch is coupled to the second node.

In another embodiment, the auxiliary circuit also includes a voltage dropper having a first terminal coupled to the second terminal of the second switch and a second terminal coupled to the second node.

In another embodiment, the comparison circuit comprises an operational amplifier having a first input corresponding to the input of the comparison circuit, a second input coupled to a voltage reference having a voltage corresponding to the second threshold, and an output corresponding to the output of the comparison circuit.

In yet another embodiment, the comparison circuit comprises a voltage divider having an input coupled to the second node, a reference coupled to ground, and an output corresponding to the input of the comparison circuit. The voltage divider is configured to provide the second voltage at the input of the comparison circuit as a fraction of the first voltage at the second node.

In accordance with yet another embodiment, an auxiliary circuit for providing current to one of a plurality of external devices during an overvoltage event includes a selector circuit having a common node and a plurality of first nodes each for coupling to one of the plurality of external devices. The selector circuit is configured to couple the common node to one of the plurality of first nodes when a first voltage at the one of the plurality of first nodes exceeds a first threshold. A comparison circuit has an input coupled to the common node. The comparison circuit is configured to compare a second voltage at the input to a second threshold. A switch has a control terminal coupled to an output of the comparison circuit, a first terminal coupled to a source, and a second terminal coupled to the common node. The comparison circuit is configured to provide a third voltage at the control terminal when the second voltage at the input exceeds the second threshold. The switch is configured to provide the current from the source to the one of the plurality of external devices when the third voltage exceeds a threshold of the switch.

In an embodiment, the selector circuit includes a plurality of diodes each having an input terminal corresponding to one of the plurality of first nodes and an output coupled to the common node.

In another embodiment, the auxiliary circuit also includes a voltage dropper disposed between the switch and the common node. The voltage dropper has a first terminal coupled to the second terminal of the switch and a second terminal coupled with the common node.

In yet another embodiment, the comparison circuit comprises an operational amplifier having a first input corresponding to the input of the comparison circuit, a second input coupled to a voltage reference, and an output corresponding to the output of the comparison circuit.

Numerous benefits may be realized using embodiments described herein over conventional devices. For example, in some embodiments, an auxiliary circuit may provide current to turn on a conventional overvoltage protection device during an overvoltage event. The event may be a slow changing event that may not otherwise result in the overvoltage protection device being turned on. In some embodiments, the auxiliary circuit may be coupled to more than one overvoltage protection device. The auxiliary circuit may be configured to provide current to the overvoltage protection device associated with the highest (or lowest) voltage beyond a predetermined threshold. Depending on the embodiment, one or more of these benefits may exist. These and other benefits are described throughout the specification with reference to the drawings.

DETAILED DESCRIPTION

Embodiments described herein relate generally to auxiliary circuits for overvoltage protection. In some embodiments, the auxiliary circuits may be configured for use with conventional overvoltage protection devices. The auxiliary circuits provide protection against overvoltage events, particularly slow changing overvoltage events, that may not otherwise turn on the overvoltage protection device to clamp the voltage.

Embodiments in this application are described in relation to telephony systems, and in particular telephony systems using SLICs. These systems operate on a negative voltage framework. The embodiments are not limited to this particular application, however, and may be used with other systems that operate on a positive voltage framework by adjusting voltage ranges and thresholds.

Figure 1:
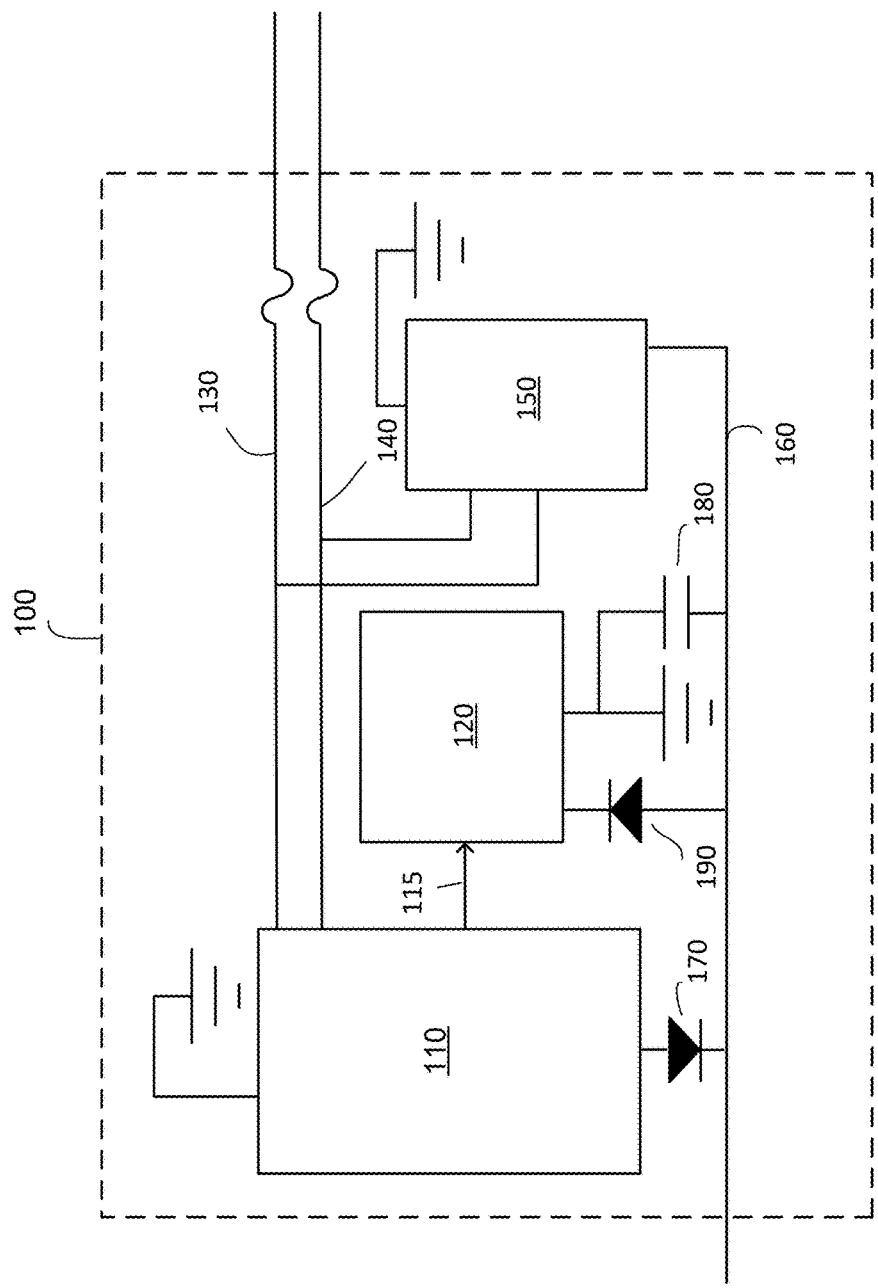
FIG. 1 is a simplified diagram of an exemplary system with which one or more embodiments of the present invention may be used.

FIG. 1 is a simplified diagram of an exemplary system 100 with which one or more embodiments of the present invention may be used. The SLIC 110 may be connected to an analog telephone disposed outside the system 100 via the Tip 130 and Ring 140. The system 100 may be part of a larger telephony system that supports functions such as voice over IP.

As mentioned previously, the voltage on the rail 160 may follow the voltage on the Tip 130 and Ring 140 during slow changing overvoltage events, preventing the overvoltage protector 150 from receiving adequate power to turn on. In these situations, an auxiliary circuit, such as one of the auxiliary circuits described below with reference to FIGS. 2-4, may be used with the overvoltage protector 150. The auxiliary circuit provides current to the overvoltage protector 150 during overvoltage events to ensure that the overvoltage protector 150 turns on. As shown in FIG. 1, the overvoltage protector 150 may be coupled to other devices, such as an auxiliary circuit, outside the system 100 via the rail 160.

The system 100 shown in FIG. 1 is provided merely as an example of an exemplary system with which one or more embodiments of the present invention may be used. Embodiments described herein are not limited to use with the system 100, however, and may be used with other systems that include different devices and configurations and/or that are used in different applications.

Figure 2:
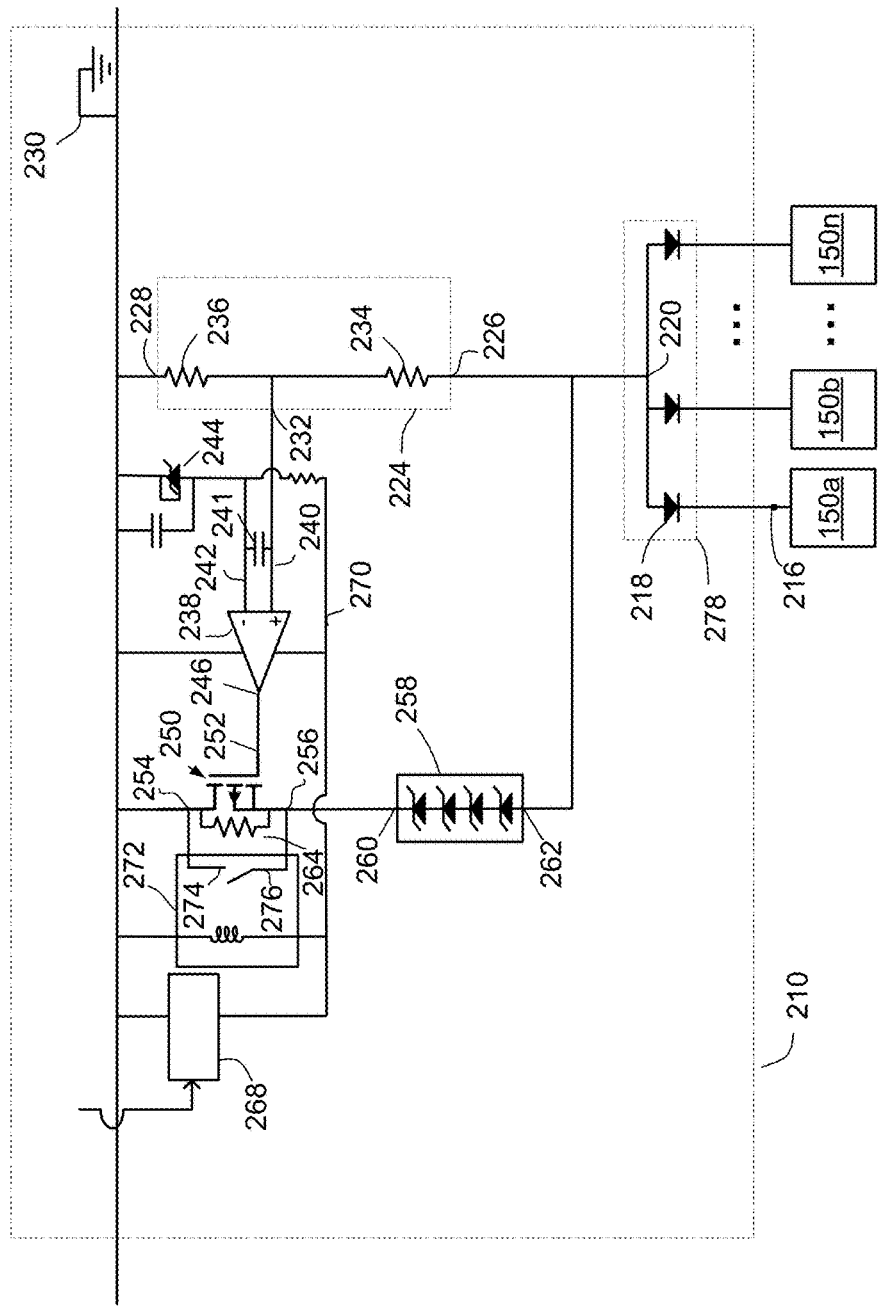
FIGS. 2-4 are simplified diagrams of exemplary auxiliary circuits in accordance with various embodiments.

FIG. 2 is a simplified diagram of an auxiliary circuit 210 in accordance with an embodiment. In this example, the auxiliary circuit 210 is coupled to external devices 150a, 150b, . . . 150n. In an embodiment, the external devices 150a-150n are overvoltage protectors similar to the overvoltage protector 150 described with regard to FIG. 1. The external devices 150a-150n may each be coupled to a tracking power supply (not shown) and one or more integrated circuits (not shown) similar to that shown in the system 100 of FIG. 1. The external devices 150a-150n may be for protecting the integrated circuits against foreign overvoltage events. An example of this is shown in FIG. 1, where the overvoltage protector 150 protects the SLIC 110 from overvoltage events on the Tip 130 and Ring 140.

The auxiliary circuit 210 enhances performance of the external devices 150a-150n by providing current to the devices via node 216 if the voltage at 216 exceeds certain limits. The limits may be determined based on a maximum voltage that the integrated circuits can reliably tolerate (e.g., the maximum voltage the SLIC can tolerate). The voltage at the node 216 may be supplied by a tracking power supply as described with regard to the system 100, in which case the voltage is representative of that on the lines being monitored and protected from overvoltage events.

In some embodiments, the auxiliary circuit 210 may be coupled to only one external device, such as the external device 150a, rather than multiple external devices. Operation of the auxiliary circuit 210 will be described with regard to a single external device 150a. The operation may be extended to the multiple external devices 150a-150n.

The auxiliary circuit 210 may operate in multiple states. For example, in a first state the voltage at the node 216 is less than a threshold voltage of the diode 218. In this state, the diode 218 is reverse biased and the auxiliary circuit 210 is electrically isolated from the external device 150a.

In a second state, the voltage at the node 216 is greater in magnitude than the threshold voltage of the diode 218 but less than that required for the auxiliary circuit 210 to provide appreciable current to the external device 150a. In this state, the auxiliary circuit 210 is electrically coupled to the external device 150a and senses the voltage at the node 216.

In a third state, the voltage at the node 216 is greater in magnitude than the threshold voltage of the diode 218 and sufficient for the auxiliary circuit 210 to provide current to the external device 150a. The current flows from the auxiliary circuit 210 to the external device 150a through the node 216. If the external device is an overvoltage protector, the current can drive the gate of the overvoltage protector and turn on the overvoltage protector.

Some embodiments may not operate in each of these states. For example, some embodiments may operate only in the first and third states depending on the thresholds of the devices.

The diode 218 is disposed between a voltage divider 224 and the external device 150a. When used for overvoltage protection of a SLIC, the diode 218 is configured to have a negative threshold so that when a voltage at the node 216 (e.g., on line 160 in FIG. 1) is either positive or less negative than the threshold, the diode 218 is off and the auxiliary circuit 210 is in an off state (e.g., the first state). When the voltage at the node 216 is more negative than the voltage, the diode 218 turns on and electrically couples the nodes 216 and 220.

The voltage divider 224 is coupled to the node 220 and is configured to provide a scaled down voltage to operational amplifier (op amp) 238. The voltage divider has an input 226 coupled to the node 220, a reference 228 coupled to ground, and an output 232 coupled to the op amp 238. The voltage divider 224 may be a resistive divider that scales down an input voltage using resistors 234 and 236. The first resistor 234 is disposed between the input 226 and the output 232. The second resistor 236 is disposed between the output 232 and the reference 228. Capacitor 241 provides a low pass filter.

The op amp 238 has a first input 240 coupled to the output 232 of the voltage divider 224, a second input 242 coupled to a voltage reference, and an output 246 coupled to a transistor 250. The voltage reference is a precise reference that may be provided using a Zener diode 244 and power supply 268 (e.g., a DC-DC converter). The power supply 268 also powers the op amp 238. In another embodiment, the Zener diode 244 may be replaced by a shunt regulator.

For telephony applications, where the diode 218 has a negative threshold, the voltage at the first input 240 of the op amp 238 will be negative, and the power supply 268 is used to provide a negative reference. The op amp 238 compares the voltage on the first input 240 to the voltage reference on the second input 242, and if the voltage at the first input 240 is more negative than the voltage reference (more negative than a second threshold), the op amp 238 provides a voltage at the output 246 that drives a gate of the transistor 250.

The transistor 250 has a control terminal 252 coupled to the output 246 of the op amp 238, a first terminal 254 coupled to the ground, and a second terminal 256 coupled to a voltage dropper 258. The transistor 250 may be a MOSFET (e.g., a p-channel MOSFET). When the voltage at the control terminal 252 exceeds a threshold, the transistor 250 provides current to the external device 150a. The node 216 is coupled to ground 230 and the current flows from the ground to the node 216. The current turns on the external device 150a and the external device 150a clamps the voltage on the lines it is configured to protect. In some embodiments, the transistor 250 may include a resistor 264 disposed between the first and second terminals 254 and 256 of the transistor 250.

In some embodiments, the auxiliary circuit 210 includes a voltage dropper 258. The voltage dropper 250 has a first terminal 260 coupled to the second terminal 256 of the transistor 250 and a second terminal 262 coupled to the node 220. The voltage dropper 258 may include one or more Zener diodes as shown in FIG. 2. The voltage dropper 258 is configured to dissipate power from the current or transistor 250. A voltage drop between the first and second terminals 260 and 262 of the voltage dropper 258 corresponds to a sum of the Zener voltages of the Zener diodes.

The power supply 268 energizes the op amp 238 and energizes the Zener diode 244 for the voltage reference at the second input 242 of the op amp 238. As explained above, the power supply 268 in this example provides a negative reference. In other embodiments, a voltage on rail 270 may be provided by another device or circuit.

Some embodiments may also include a normally closed relay 272 configured as a backup switch. Terminals 274 and 276 of the normally closed relay 272 are respectively coupled to terminals 254 and 256 of the transistor 250. The normally closed relay 272 is configured to provide current from the ground 230 to the external device 150a if the power supply 268 fails or is intentionally disabled. This ensures that the external device 150a protects the IC (e.g., SLIC) if the power supply 268 fails or the system is not energized. When the power supply 268 is operating normally, the normally closed relay 272 is energized and its contacts are open so that it has no effect on the auxiliary circuit 210. If the power supply fails or is disabled and the voltage at the node 216 is less than the threshold, the diode remains off and no current flows to the external device 150a.

In some embodiments, the auxiliary circuit 210 may be coupled to multiple external devices 150a-150n through multiple diodes in the form of a diode-or 278. The diode-or 278 couples the multiple external devices 150a-150n to the auxiliary circuit 210 via the node 220. In an embodiment, only one of the diodes turns on at a time (e.g., diode 218). The diode that turns on is the one that has a voltage that exceeds the threshold of the diode by the largest magnitude. Other diodes having voltages that either do not exceed the threshold or that exceed the threshold by a lesser magnitude remain off.

In some embodiments, the auxiliary circuit may be integrated with the one or more external devices (e.g., overvoltage protectors) as part of the same device or circuit. In other embodiments, the auxiliary circuit may be a separate device or circuit that can be coupled to one or more other external devices.

The auxiliary circuit 210 may be used in a number of different applications. Example voltages in a typical SLIC application are as follows:

The maximum tolerance of a typical SLIC is about −140 V;

This provides an operating window of between about −10 V to −125 V;

Using about 10 V for biasing and signal overhead, an operating voltage on Tip and Ring lines is between about 0 V and −115 V;

Based on these values, an overvoltage protector may be configured to clamp voltages on Tip and Ring lines exceeding between about −120 V to −130 V;

The diode coupling the overvoltage protector to the auxiliary circuit may be configured to turn on between about −120 V to −130 V;

Voltage supplied to the auxiliary circuit (e.g, at rail 270) may be between about −10 V to −14 V; and The voltage reference at the second input of the op amp may be between about −2 V to −3 V.

These voltages are provided merely as examples of a typical SLIC application and are not intended to limit the embodiments described herein.

Figure 3:
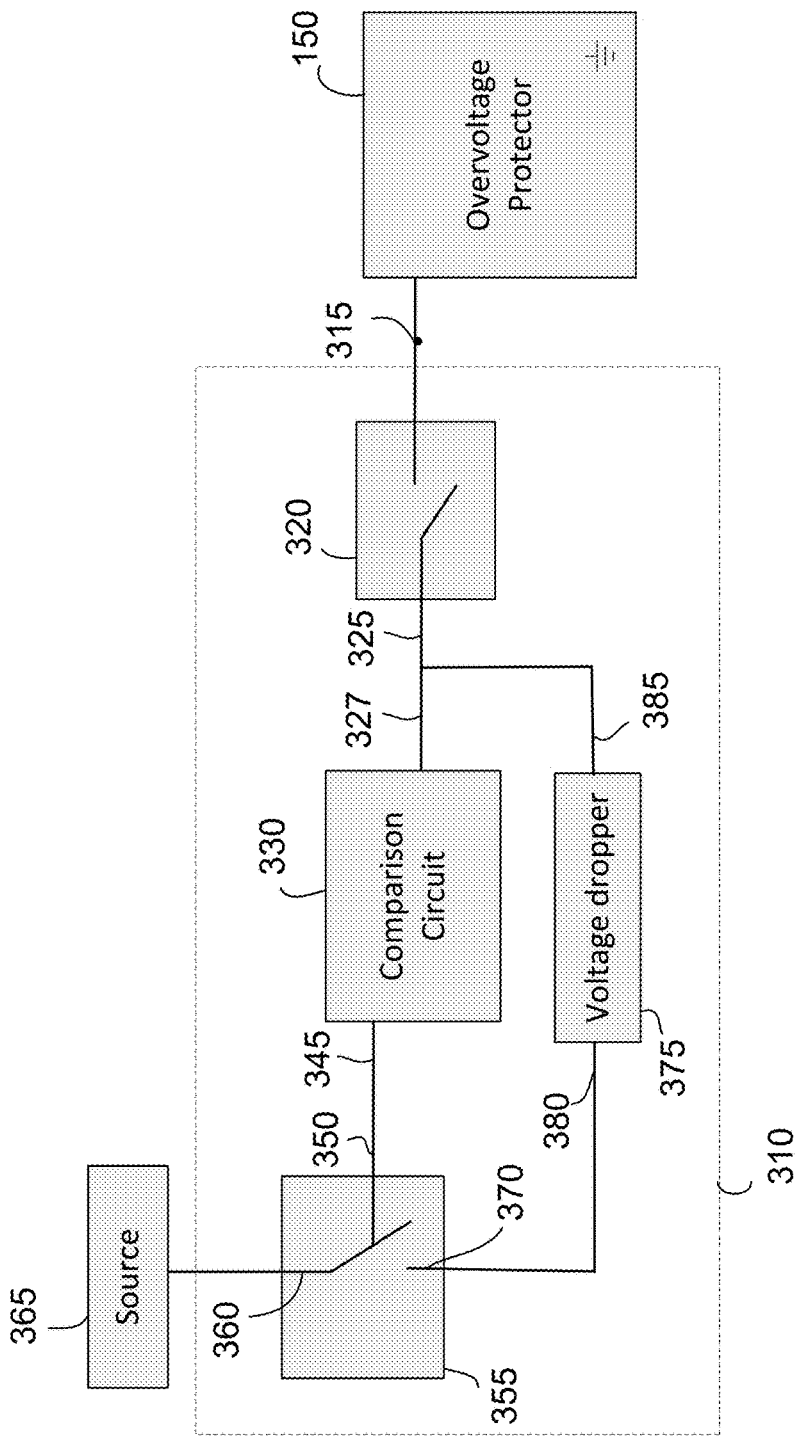

FIG. 3 is a simplified diagram of an auxiliary circuit in accordance with another embodiment. In this embodiment, an auxiliary circuit 310 is configured to provide current to an overvoltage protector 150. The overvoltage protector 150 may be a conventional overvoltage protection device.

The auxiliary circuit 310 includes a first switch 320 disposed between a first node 315 and a second node 325. The first node is for coupling the auxiliary circuit 310 to the overvoltage protector 150. The first switch 320 is configured to electrically couple the first node 315 to the second node 325 when a first voltage at the first node 315 exceeds a first threshold.

The auxiliary circuit 310 also includes a comparison circuit 330 having an input 327 coupled to the second node 325. A second voltage at the input 327 of the comparison circuit 330 is representative of the first voltage. The comparison circuit 330 is configured to compare the second voltage to a second threshold.

A second switch 355 has a control terminal 350 coupled to an output 345 of the comparison circuit 330, a first terminal 360 coupled to a source 365, and a second terminal 370 for coupling to the overvoltage protector 150. The source 365 may be ground in some embodiments.

The comparison circuit 330 is configured to provide a third voltage at the output 345 (or the control terminal 350) when the second voltage at the input 327 exceeds the second threshold. The second switch 355 is configured to provide the current from the source 365 to the overvoltage protector 150 when the third voltage exceeds a threshold of the second switch 355.

In an embodiment, second terminal 370 of the second switch 355 may be coupled to the second node 325, and the current may be provided to the overvoltage protector 150 through the first switch 320.

In some embodiments, the auxiliary circuit 310 also includes a voltage dropper 375 having a first terminal 380 coupled to the second terminal 370 of the second switch 355 and a second terminal 385 coupled to the second node 325.

In some embodiments, the comparison circuit 330 may include an op amp having a first input corresponding to the input 327 of the comparison circuit, a second input coupled to a voltage reference, and an output corresponding to the output 345 of the comparison circuit 330. The voltage reference may have a voltage corresponding to the second threshold. In some embodiments, the auxiliary circuit 310 may include a power supply configured to provide a supply voltage and the voltage reference for the op amp. The power supply may be the source 365 or a separate power supply. The auxiliary circuit 310 may also include a backup switch having a third terminal coupled to the first terminal 360 of the second switch 355 and a fourth terminal coupled to the second terminal 370 of the second switch 355. The backup switch may be configured to provide the current from the source 365 to the overvoltage protector 150 when the power supply fails or is disabled.

In some embodiments, the comparison circuit 330 may also include a voltage divider having an input coupled to the second node 325, a reference coupled to ground, and an output corresponding to the input 327 of the comparison circuit 330. The voltage divider may be configured to provide the second voltage at the input 327 of the comparison circuit 330 as a fraction of the first voltage at the second node 325.

Figure 4:
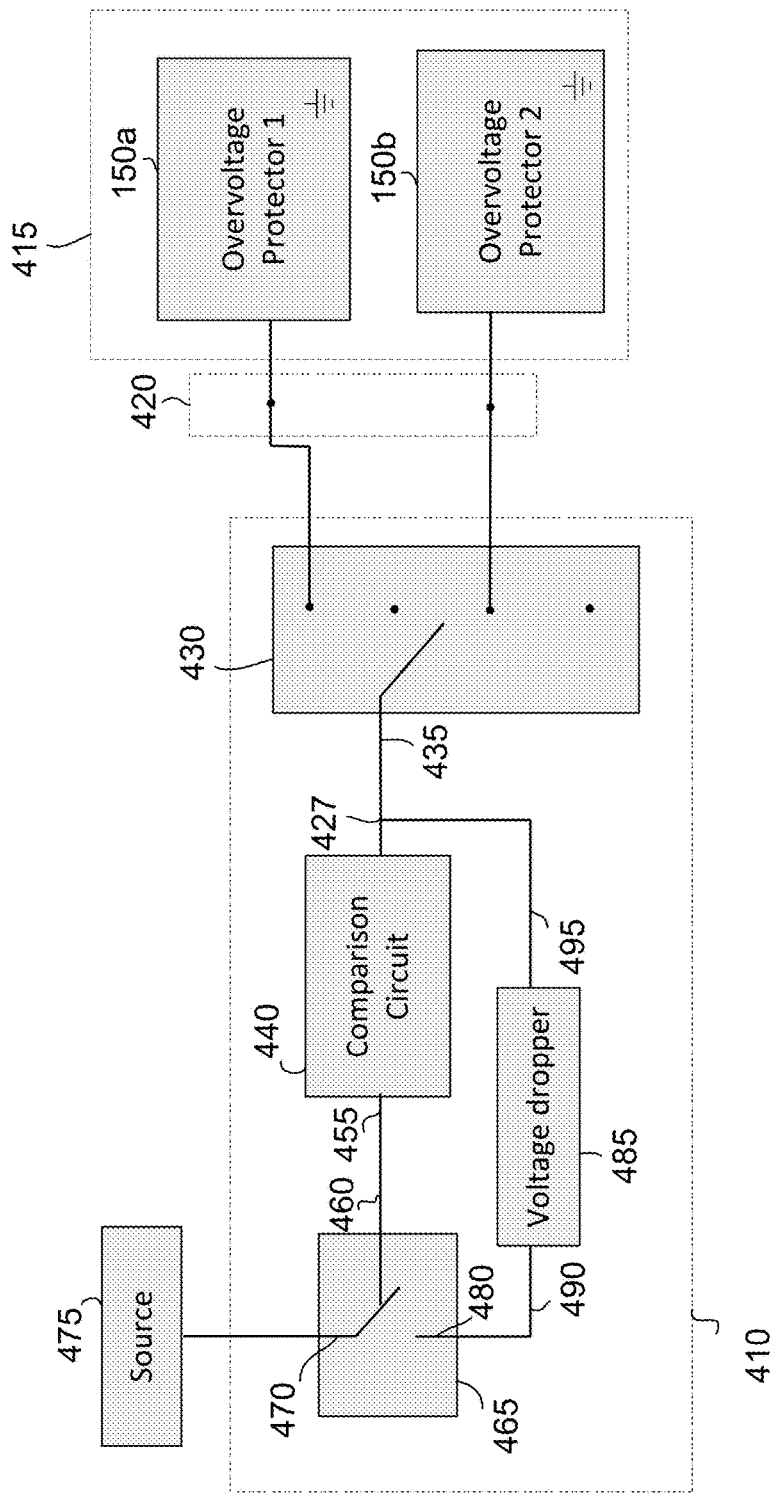

FIG. 4 is a simplified diagram of an auxiliary circuit in accordance with yet another embodiment. In this embodiment, the auxiliary circuit 410 is configured to provide current to one of a plurality of overvoltage protectors 150a and 150b. This example only shows two overvoltage protectors 150a and 150b, but the auxiliary circuit 410 may be configured for coupling to any number of external devices. The overvoltage protectors 150a and 150b may be conventional overvoltage protection devices. The auxiliary circuit 310 may be configured to provide the current to the overvoltage protectors 150a and 150b during slow changing overvoltage events.

The overvoltage protector 150 shown in FIG. 3 and the overvoltage protectors 150a and 150b shown in FIG. 4 may each be coupled to a tracking power supply (not shown) and an integrated circuit (not shown) similar to that shown in the system 100 of FIG. 1. The overvoltage protectors may also be part of other systems and/or applications.

The auxiliary circuit 410 includes a selector circuit 430 having a common node 435 and a plurality of first nodes 420 each for coupling to one of the overvoltage protectors 150a and 150b. The selector circuit 430 is configured to couple the common node 435 to one of the first nodes 420 when a first voltage at the one of the plurality of first nodes 420 exceeds a first threshold.

A comparison circuit 440 has an input 427 coupled to the common node 435. The comparison circuit 440 is configured to compare a second voltage at the input 427 to a second threshold.

A switch 465 has a control terminal 460 coupled to an output 455 of the comparison circuit 440, a first terminal coupled to a source 475, and a second terminal 480 coupled to the common node 435. In some embodiments, the switch 465 is a MOSFET. The source 475 may be ground in some embodiments.

The comparison circuit 440 is configured to provide a third voltage at the control terminal 460 when the second voltage at the input 427 exceeds the second threshold. The switch 465 is configured to provide the current from the source 475 to the one of the overvoltage protectors when the third voltage exceeds the threshold of the switch 465.

The selector switch 430 may include a plurality of diodes each having an input terminal corresponding to one of the plurality of first nodes 420 and an output coupled to the common node 435.

In some embodiments, the comparison circuit 440 may also include a voltage divider having an input coupled to the common node 435, a reference coupled to ground, and an output corresponding to the input 427 of the comparison circuit 440. The voltage divider may be configured to provide the second voltage at the input 427 of the comparison circuit 440 as a fraction of the first voltage at the common node 435.

In some embodiments, the auxiliary circuit 410 may also include a voltage dropper 485 disposed between the switch 465 and the selector switch 430. The voltage dropper 485 may have a first terminal 490 coupled to the second terminal 480 of the switch 465 and a second terminal 495 coupled to the common node 435.

The comparison circuit may include an op amp having a first input corresponding to the first input 427 of the comparison circuit 440, a second input coupled to a voltage reference, and an output corresponding to the output 455 of the comparison circuit 440.

In an embodiment, the selector circuit 420 includes a diode-or so that the current is only provided to the overvoltage protector having a voltage that exceeds the first threshold by the largest magnitude.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. An auxiliary circuit coupled to an overvoltage protection device by a first node, the auxiliary circuit configured to provide current to the overvoltage protection device during a negative-going overvoltage event, the auxiliary circuit comprising:
   a diode disposed between the first node and a second node, the diode configured to electrically couple the first node to the second node when a first voltage at the first node exceeds a first threshold;
   a voltage divider having an input coupled to the second node, a reference coupled to ground, and an output, the voltage divider configured to reduce a voltage between the input and the output;
   an operational amplifier having a first input coupled to the output of the voltage divider, a second input coupled to a voltage reference, and an output, the voltage reference providing a second threshold;

a transistor having a control terminal coupled to the output of the operational amplifier, a first terminal coupled to the ground, and a second terminal, the operational amplifier configured to provide a third voltage at the control terminal when a second voltage at the first input exceeds the second threshold, and the transistor is configured to provide the current from the ground to the overvoltage protection device when the third voltage exceeds a threshold of the transistor; and a voltage dropper having a first terminal coupled to the second terminal of the transistor and a second terminal coupled with the second node, the voltage dropper configured to receive the current passing from the ground to the overvoltage protection device and to dissipate power from the current.

2. The auxiliary circuit of claim 1, wherein the transistor is a metal-oxide-semiconductor field-effect transistor (MOSFET).

3. The auxiliary circuit of claim 1, wherein the voltage divider is a resistive divider having a first resistance disposed between the input of the voltage divider and the output of the voltage divider and a second resistance disposed between the output of the voltage divider and the reference.

4. The auxiliary circuit of claim 1, further comprising a resistor disposed between the first terminal of the transistor and the second terminal of the transistor.

5. The auxiliary circuit of claim 1, wherein the voltage dropper comprises a plurality of Zener diodes, and a voltage drop between the first terminal of the voltage dropper and the second terminal of the voltage dropper corresponds to a sum of Zener voltages of the plurality of Zener diodes.

6. The auxiliary circuit of claim 1, further comprising:
a power supply coupled with the operational amplifier, the power supply configured to provide a supply voltage for the operational amplifier and for biasing the voltage reference; and
a backup switch having a third terminal and a fourth terminal, the third terminal coupled to the first terminal of the transistor and the fourth terminal coupled to the second terminal of the transistor, the backup switch configured to provide the current from the ground to the overvoltage protection device when the power supply fails or is disabled.

7. The auxiliary circuit of claim 1, further comprising a plurality of diodes each coupled with the second node and each coupled with an overvoltage protection device by a respective node.

8. The auxiliary circuit of claim 1, where in the voltage reference is provided by a Zener diode or a precision regulator.

9. An auxiliary circuit for providing current to an external device, the auxiliary circuit comprising:
a first switch disposed between a first node and a second node, the first node for coupling to the external device, the first switch configured to electrically couple the first node to the second node when a first voltage at the first node exceeds a first threshold;
a comparison circuit having an input coupled to the second node, a second voltage at the input of the comparison circuit being representative of the first voltage, the comparison circuit configured to compare the second voltage to a second threshold; and
a second switch having a control terminal coupled to an output of the comparison circuit, a first terminal coupled to a source, and a second terminal for coupling to the external device, the comparison circuit configured to provide a third voltage at the control terminal when the second voltage at the input exceeds the second threshold, and the second switch is configured to provide the current from the source to the external device when the third voltage exceeds a threshold of the second switch.

10. The auxiliary circuit of claim 9, wherein the second terminal of the second switch is coupled to the second node.

11. The auxiliary circuit of claim 9, further comprising:
a voltage dropper having a first terminal coupled to the second terminal of the second switch and a second terminal coupled to the second node.

12. The auxiliary circuit of claim 9, wherein the comparison circuit comprises an operational amplifier having a first input corresponding to the input of the comparison circuit, a second input coupled to a voltage reference having a voltage corresponding to the second threshold, and an output corresponding to the output of the comparison circuit.

13. The auxiliary circuit of claim 2, further comprising:
a power supply configured to provide a supply voltage for the operational amplifier and the voltage reference; and
a backup switch having a third terminal and a fourth terminal, the third terminal coupled to the first terminal of the second switch and the fourth terminal coupled to the second terminal of the second switch, the backup switch configured to provide the current from the source to the external device when the power supply fails.

14. The auxiliary circuit of claim 9, wherein the comparison circuit comprises a voltage divider having an input coupled to the second node, a reference coupled to ground, and an output corresponding to the input of the comparison circuit, the voltage divider configured to provide the second voltage at the input of the comparison circuit as a fraction of the first voltage at the second node.

15. An auxiliary circuit for providing current to one of a plurality of external devices during an overvoltage event, the auxiliary circuit comprising:
a selector circuit having a common node and a plurality of first nodes each for coupling to one of the plurality of external devices, wherein the selector circuit is configured to couple the common node to one of the plurality of first nodes when a first voltage at the one of the plurality of first nodes exceeds a first threshold;
a comparison circuit having an input coupled to the common node, the comparison circuit configured to compare a second voltage at the input to a second threshold; and
a switch having a control terminal coupled to an output of the comparison circuit, a first terminal coupled to a source, and a second terminal coupled to the common node, the comparison circuit configured to provide a third voltage at the control terminal when the second voltage at the input exceeds the second threshold, and the switch is configured to provide the current from the source to the one of the plurality of external devices when the third voltage exceeds a threshold of the switch.

16. The auxiliary circuit of claim 15, wherein the switch is a metal-oxide-semiconductor field-effect transistor (MOSFET).

17. The auxiliary circuit of claim 15, wherein the selector circuit includes a plurality of diodes each having an input terminal corresponding to one of the plurality of first nodes and an output coupled to the common node.

18. The auxiliary circuit of claim 15, wherein the comparison circuit comprises a voltage divider having an input coupled to the common node, a reference coupled to ground, and an output corresponding to the input of the comparison circuit, the voltage divider configured to provide the second voltage at the input of the comparison circuit as a fraction of the first voltage at the common node.

19. The auxiliary circuit of claim 15, further comprising:
a voltage dropper disposed between the switch and the common node, the voltage dropper having a first terminal coupled to the second terminal of the switch and a second terminal coupled with the common node.

20. The auxiliary circuit of claim 15, wherein the comparison circuit comprises an operational amplifier having a first input corresponding to the input of the comparison circuit, a second input coupled to a voltage reference, and an output corresponding to the output of the comparison circuit.

* * * * *